(12) United States Patent (10) Patent No.: US 7,594,135 B2
Gonzalez et al. (45) Date of Patent: Sep. 22, 2009

(54) FLASH MEMORY SYSTEM STARTUP OPERATION

(75) Inventors: Carlos J. Gonzalez, Los Gatos, CA (US); Andrew Tomlin, San Jose, CA (US)

(73) Assignee: Sandisk Corporation, Milpitas, CA (US)

( * ) Notice: Subject to any disclaimer, the term of this patent is extended or adjusted under 35 U.S.C. 154(b) by 1119 days.

(21) Appl. No.: 10/751,033

(22) Filed: Dec. 31, 2003

(65) Prior Publication Data

US 2005/0160217 A1 Jul. 21, 2005

(51) Int. Cl.
*G06F 11/00* (2006.01)

(52) U.S. Cl. .............................. 714/5; 714/6

(58) Field of Classification Search ........................ None
See application file for complete search history.

(56) References Cited

U.S. PATENT DOCUMENTS

| | | | |
|---|---|---|---|
| 4,439,837 A | 3/1984 | Aiena et al. |
| 4,462,086 A | 7/1984 | Kurakake |
| 4,590,557 A | 5/1986 | Lillie |
| 4,910,666 A | 3/1990 | Nibby, Jr. et al. |
| 4,914,576 A | 4/1990 | Zelley et al. |
| 5,003,591 A | 3/1991 | Kauffman et al. |
| 5,034,915 A | 7/1991 | Styrna et al. |
| 5,043,940 A | 8/1991 | Harari |
| 5,058,074 A | 10/1991 | Sakamoto |
| 5,095,344 A | 3/1992 | Harari |
| 5,148,516 A | 9/1992 | Hassoun |
| 5,172,338 A | 12/1992 | Mehrotra et al. |
| 5,268,928 A | 12/1993 | Herh et al. |
| 5,313,421 A | 5/1994 | Guterman et al. |
| 5,315,541 A | 5/1994 | Harari et al. |

(Continued)

FOREIGN PATENT DOCUMENTS

EP 0 489 204 A1 6/1992

(Continued)

OTHER PUBLICATIONS

Chan et al. "A True Single Transistor Oxide-Nitride-Oxide EEPROM Device," IEEE Electron Device Letters, vol. EDL-8, No. 3, Mar. 1987, pp. 93-95.

(Continued)

*Primary Examiner*—Michael C Maskulinski
(74) *Attorney, Agent, or Firm*—Davis Wright Tremaine LLP

(57) ABSTRACT

Multiple copies of firmware code for controlling operation of a non-volatile flash memory system are stored at different suitable locations of the flash memory of a memory system. A map of addresses of these locations is also stored in the flash memory. Upon initialization of the memory system, boot code stored in the memory controller is executed by its microprocessor to reference the address map and load one copy of the firmware from the flash memory into a controller memory, from which it may then be executed by the microprocessor to operate the memory system to store and retrieve user data. An error correction code (ECC) is used to check the data but the best portions of the two or more firmware copies stored in the flash memory are used to reduce the need to use ECC. The firmware code may be stored in the flash memory in two-states when user data is stored in the same memory in more than two-states.

27 Claims, 7 Drawing Sheets

U.S. PATENT DOCUMENTS

| | | | |
|---|---|---|---|
| 5,343,063 A | 8/1994 | Yuan et al. | |
| 5,379,342 A | 1/1995 | Arnold et al. | |
| 5,402,383 A | 3/1995 | Akaogi | |
| 5,532,962 A | 7/1996 | Auclair et al. | |
| 5,570,032 A | 10/1996 | Atkins et al. | |
| 5,570,315 A | 10/1996 | Tanaka et al. | |
| 5,603,001 A | 2/1997 | Sukegawa et al. | |
| 5,606,660 A | 2/1997 | Estakhri et al. | |
| 5,661,053 A | 8/1997 | Yuan | |
| 5,774,397 A | 6/1998 | Endoh et al. | |
| 5,930,167 A | 7/1999 | Lee et al. | |
| 6,046,935 A | 4/2000 | Takeuchi et al. | |
| 6,073,207 A | 6/2000 | Ideta | |
| 6,151,246 A | 11/2000 | So et al. | |
| 6,154,838 A | 11/2000 | Le et al. | |
| 6,168,321 B1 | 1/2001 | Tanaka et al. | |
| 6,222,762 B1 | 4/2001 | Guterman et al. | |
| 6,301,656 B1 | 10/2001 | Streett et al. | |
| 6,330,634 B1* | 12/2001 | Fuse et al. | 711/103 |
| 6,426,893 B1 | 7/2002 | Conley et al. | |
| 6,442,623 B1* | 8/2002 | Kim | 710/8 |
| 6,456,528 B1 | 9/2002 | Chen | |
| 6,522,580 B2 | 2/2003 | Chen et al. | |
| 6,665,813 B1* | 12/2003 | Forsman et al. | 714/15 |
| 7,082,525 B2 | 7/2006 | Hutton et al. | |
| 2002/0039322 A1 | 4/2002 | Tran et al. | |
| 2003/0109093 A1 | 6/2003 | Harari et al. | |
| 2003/0172261 A1 | 9/2003 | Lee et al. | |
| 2003/0221092 A1* | 11/2003 | Ballard et al. | 713/1 |
| 2004/0088534 A1* | 5/2004 | Smith et al. | 713/1 |
| 2004/0205328 A1* | 10/2004 | Langford et al. | 713/1 |
| 2005/0060531 A1* | 3/2005 | Davis et al. | 713/2 |
| 2005/0073884 A1 | 4/2005 | Gonzalez et al. | |
| 2005/0081090 A1* | 4/2005 | Lin | 714/6 |

FOREIGN PATENT DOCUMENTS

| | | |
|---|---|---|
| EP | 0 709 782 A2 | 5/1996 |
| EP | 0 803 812 A1 | 10/1997 |
| EP | 0905704 | 3/1999 |
| EP | 1 241 571 A2 | 9/2002 |
| WO | 03/014923 | 2/2003 |

OTHER PUBLICATIONS

EPO/ISA, "Notification of Transmittal of the International Search Report and the Written Opinion of the International Searching Authority, or the Declaration", mailed in corresponding PCT/US2004/042965 on May 31, 2005, 15 pages.

European Patent Office, "Substantive Examination," mailed in corresponding European Patent Application No. 04 815 082.5 on Oct. 20, 2006, 3 pages.

Office Action for Chinese Patent Application No. 200480039310.9 for SanDisk Corporation, mailed Aug. 8, 2007, 6 pages.

EPO, "Office Action," corresponding European Patent Application No. 04 815 082.5, mailed on Sep. 21, 2007, 6 pages.

China State Intellectual Property Office, "Second Office Action," corresponding Chinese Patent Application No. 200480039310.9, mailed on Aug. 22, 2008, 9 pages (including translation).

EPO, "Office Communication," corresponding European Patent Application No. 04 815 082.5, mailed on Mar. 13, 2009, 9 pages.

Office Action for Chinese Patent Application No. 200480039310.9 for SanDisk Corporation, mailed Aug. 8, 2007, 6 pages.

* cited by examiner

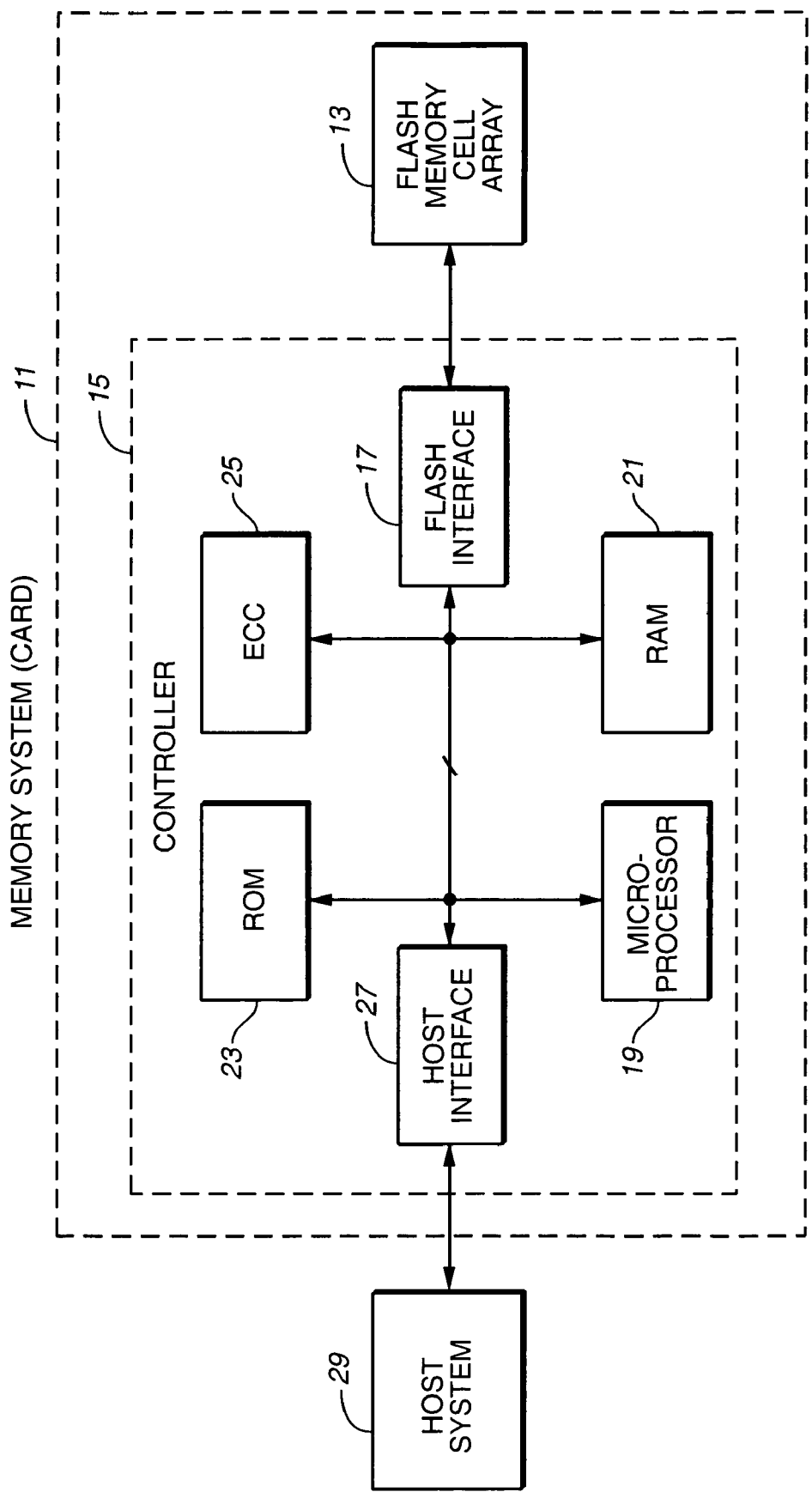
FIG._1

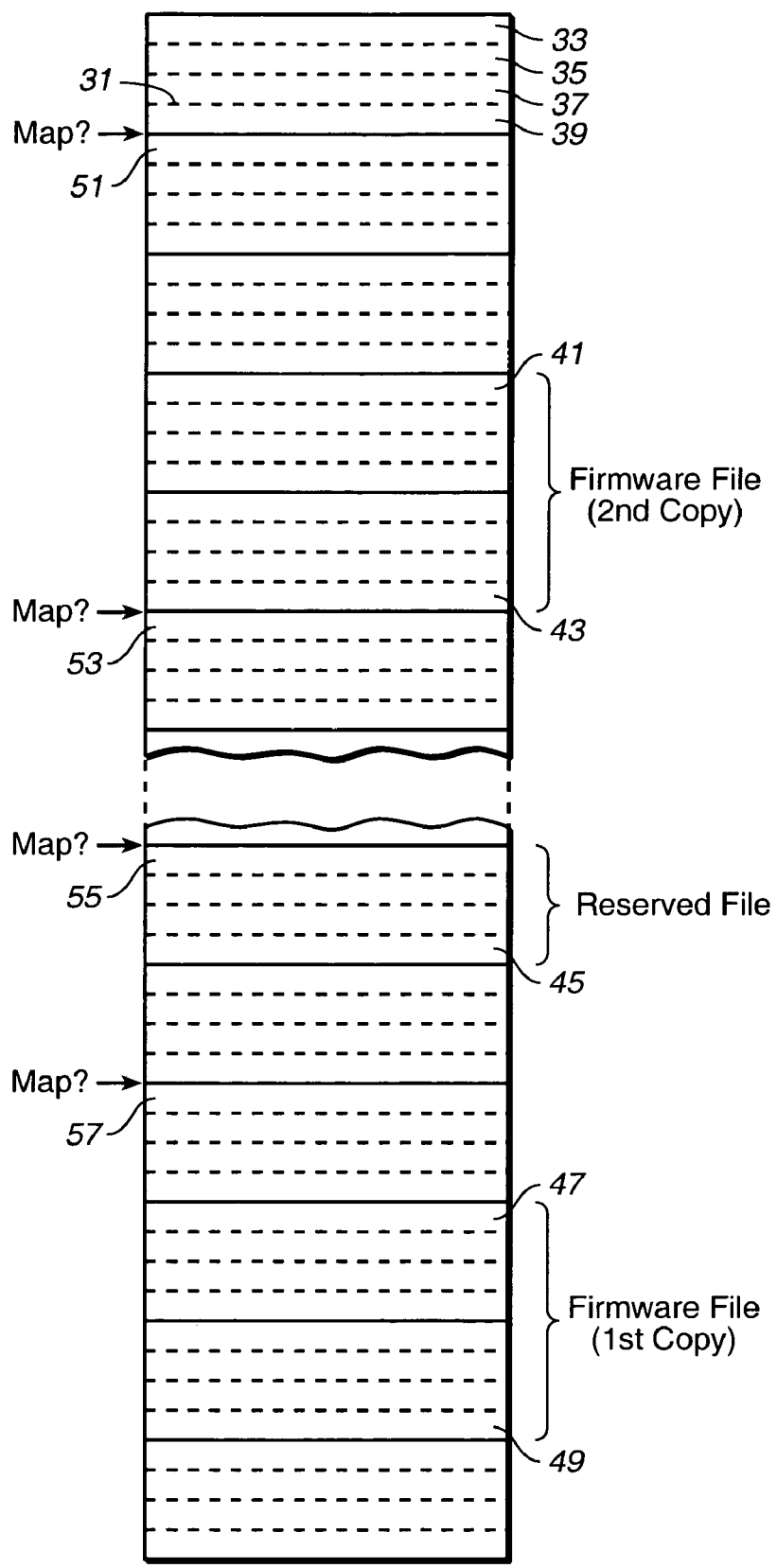
FIG._2

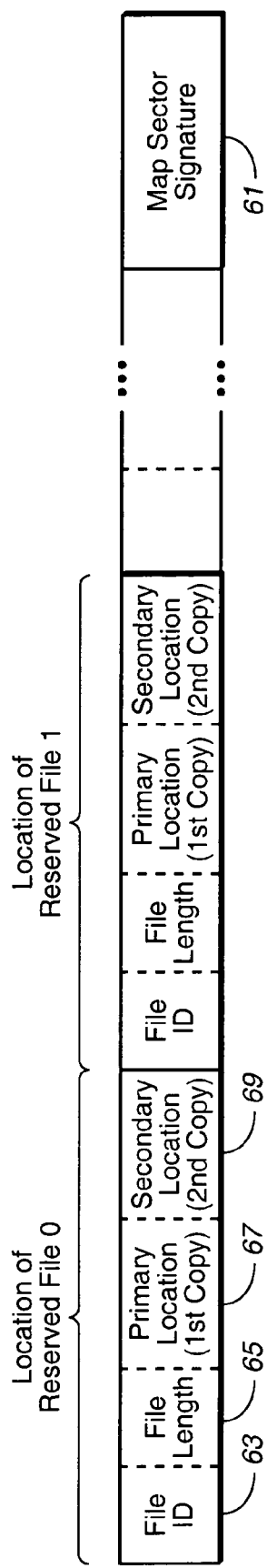
FIG._3
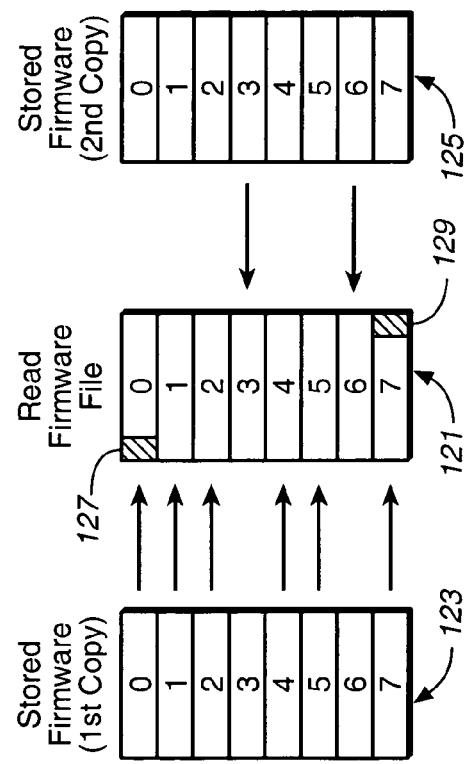
FIG._5

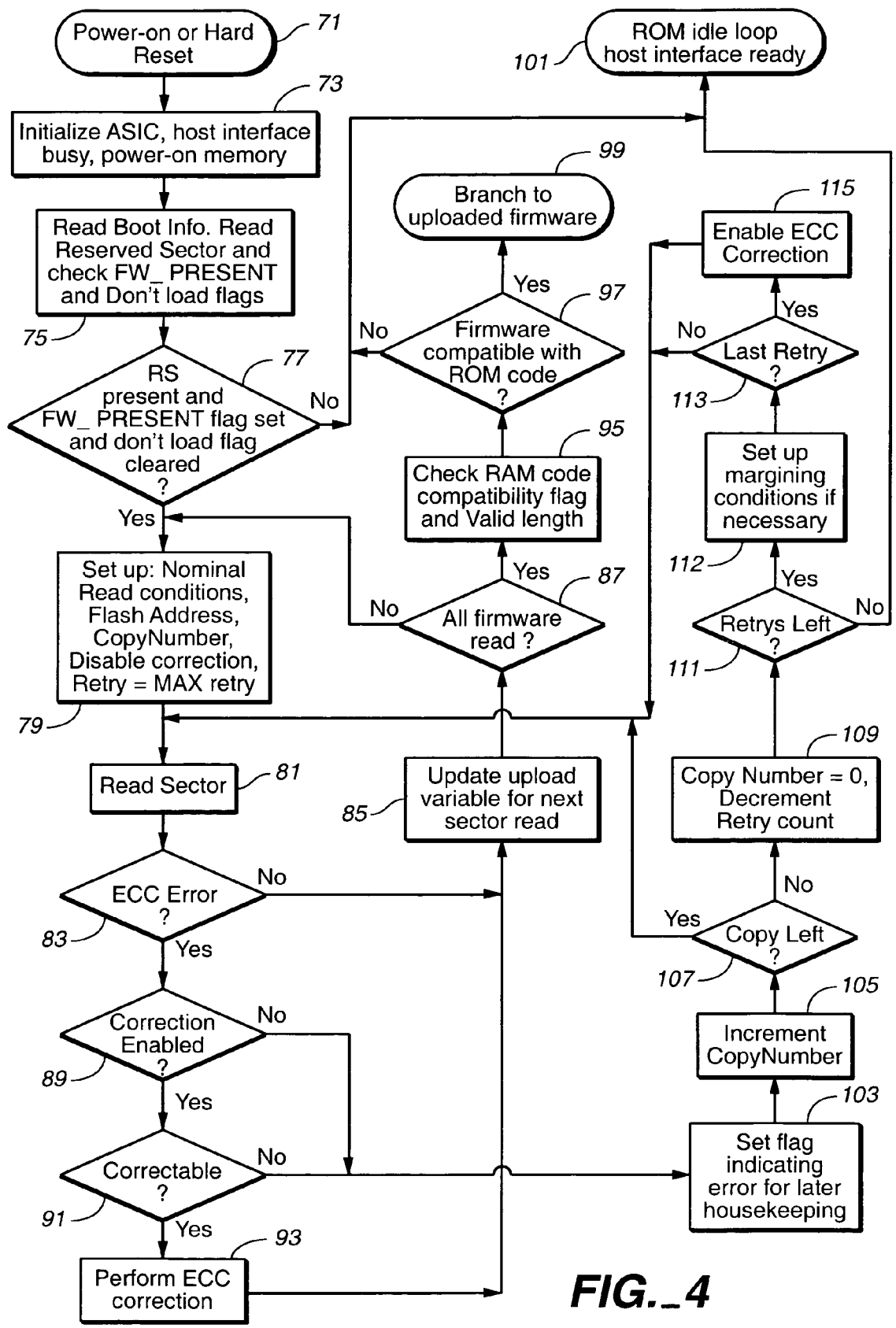
FIG._4

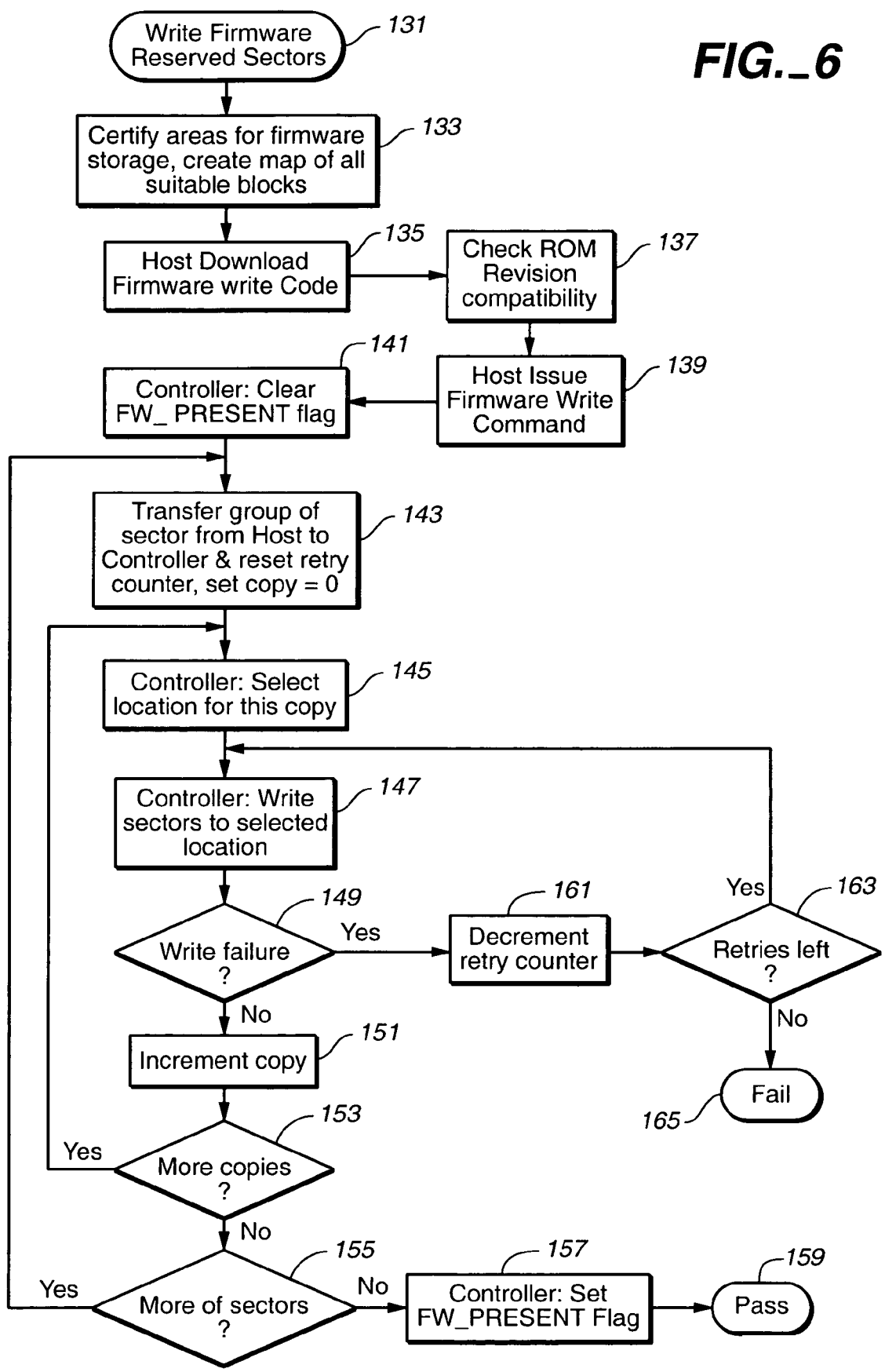
FIG._6

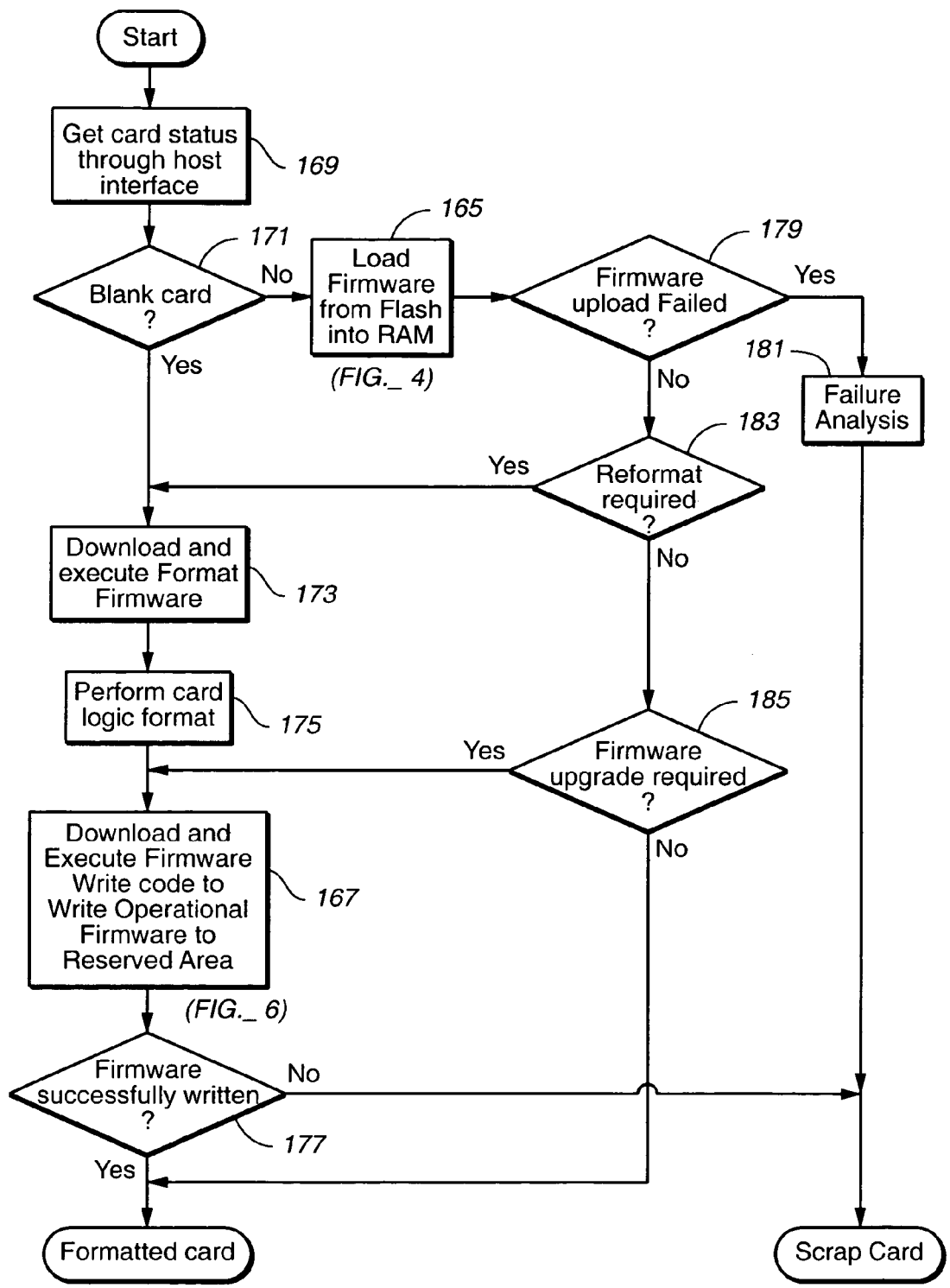
FIG._7

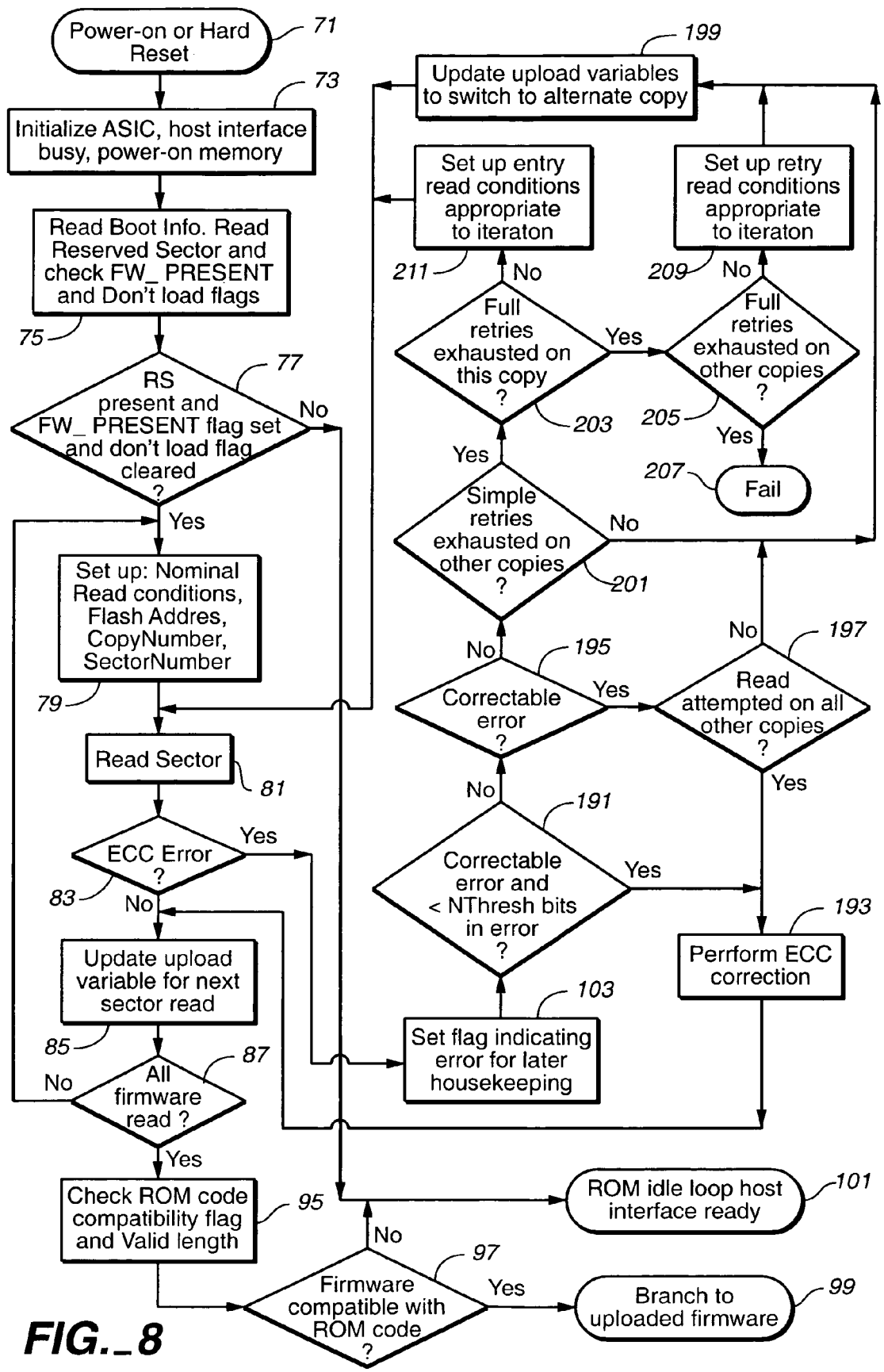
FIG._8

FLASH MEMORY SYSTEM STARTUP OPERATION

FIELD OF THE INVENTION

This invention is related generally to initialization of a controller of a non-volatile flash memory system, and, more specifically, to storing operating firmware in flash memory and to reading the stored firmware into a controller memory upon initialization or resetting of the memory system.

BACKGROUND

There are many commercially successful non-volatile memory products being used today, particularly in the form of small form factor cards, which employ an array of flash EEPROM (Electrically Erasable and Programmable Read Only Memory) cells. A memory controller is also included in the card for interfacing with a host to which the card is connected and for controlling operation of the memory array within the card. Such a controller typically includes a microprocessor, some non-volatile read-only-memory (ROM) and a volatile random-access-memory (RAM). Besides the memory card implementation, this type of memory system, in the form of one or more integrated circuits, can alternatively be embedded into various types of host systems.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315, 5,774,397, 6,046,935, and 6,522,580.

The charge storage elements of current flash EEPROM arrays, as discussed in the foregoing referenced patents and articles are most commonly electrically conductive floating gates, typically formed from doped polysilicon material. Another type of memory cell useful in flash EEPROM systems utilizes a non-conductive dielectric material in place of a conductive floating gate to store charge in a non-volatile manner. Such a cell is described in an article by Chan et al., "A True Single-Transistor Oxide-Nitride-Oxide EEPROM Device," IEEE Electron Device Letters, Vol. EDL-8, No. 3, March 1987, pp. 93-95. A triple layer dielectric formed of silicon oxide, silicon nitride and silicon oxide ("ONO") is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures employing dielectric storage elements are described in U.S. patent application Ser. No. 10/280,352, filed Oct. 25, 2002, publication no. 2003-0109093.

As in most all integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage element. This is accomplished by dividing a window of a storage element charge level voltage range into more than two states. The use of four such states allows each cell to store two bits of data, eight states stores three bits of data per storage element, and so on. Multiple state flash EEPROM structures using floating gates and their operation are described in U.S. Pat. Nos. 5,043,940 and 5,172,338, and for structures using dielectric floating gates in aforementioned U.S. application Ser. No. 10/280,352. Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete blocks of cells that are erased together. That is, the block is the erase unit. Each block typically stores one or more pages of data, the page being the minimum unit of programming and reading, although more than one page may be programmed or read in a single operation. Each page typically stores one or more sectors of data, the size of the sector being defined by the host system. An example sector includes 512 bytes of user data, following a standard established with magnetic disk drives, plus some number of bytes of overhead information about the user data and/or the block in which they are stored. Memory systems are typically configured with 16, 32 or more pages within each block, and each page stores one or just a few host sectors of data.

The controller in a flash memory system typically includes a microprocessor that executes instructions from a firmware operating system, in order to control operation of the memory array and the flow of data between the array and the host system. In some commercial products, this firmware is stored in a small flash EEPROM as part of the controller, typically an integrated circuit chip that is separate from one or more memory cell array integrated circuit chips. The use of a flash memory allows the firmware to be easily updated by re-programming. The firmware is typically read from the flash memory and into the controller RAM upon the system either being powered up or reset. A small amount of booting code stored in the controller ROM is initially executed by the controller microprocessor to load the firmware into RAM. The microprocessor then executes instructions of the firmware from the RAM, since a type of such a memory may be used that can be read much faster than the flash memory. The RAM is, of course, volatile but if power is lost, the firmware is again loaded from the flash memory into the RAM upon power being restored and operation of the memory system is resumed.

Although this firmware booting system operates quite well, the controller integrated circuit chip is expensive because a different process must be used to form the flash memory than is used to form the remaining circuits on the chip. It has therefore been suggested, in order to reduce product cost, to store the firmware in designated blocks of the flash memory cell array that are not allowed to be accessed by the host to store user data. Upon system initialization, the controller microprocessor executes the ROM boot code to load the firmware into the RAM from designated blocks of flash memory. This still allows nearly all the firmware to be changed and updated by re-programming into those flash blocks since only a small amount of code is stored in the ROM for loading the firmware.

SUMMARY

Maintaining the integrity of the firmware that is loaded into the controller RAM is obviously extremely important. Any error in the loaded firmware, even in only one bit, can cause the memory system to operate irregularly, or even fail to operate at all. In addition to other negative effects of such irregular operation or failure, user data can be corrupted as it is programmed or read, or even rendered irretrievable from the memory. Even if the error is later corrected by reloading the firmware, or another copy of it, irreparable damage may have already been done to user data or the ability to read it from the flash memory. Therefore, steps are taken both in the process of programming the firmware into reserved blocks of the flash memory and during its transfer to RAM upon system initialization to improve the integrity of the firmware that controls operation of the microprocessor to program and store user data in other blocks of the flash memory.

Two or more copies of the operating firmware are stored at different locations in the flash memory. Those locations need not be fixed. Rather, reserved blocks of memory cells of each card or embedded memory system may be optimally selected for storing the firmware at the time the firmware is programmed into the memory as one of the final manufacturing steps of each system. A map with addresses of the blocks in which the firmware copies are stored is also programmed into one of a few specified blocks of the memory during manufacture. The ROM boot code causes the controller microprocessor to address these few specified blocks in sequence until it finds the address map. The map is then copied into the controller RAM, and the address of the flash memory block in which the beginning of the first copy of the firmware exists is read from the map by the microprocessor and then used to address that block to commence copying the first firmware copy into RAM. Use of the programmable firmware address map allows the firmware to be stored in different flash memory locations on different cards without increasing the complexity of the ROM boot code or booting process.

Although the usual flash memory is operated in multiple states for user data, the reserved blocks storing the firmware may be operated in binary or a fewer number of states than used for the user data. That is, although the storage elements of the memory cells in a majority of the flash memory store two or more bits of data, those of the reserved blocks may be operated to each store a lesser number of one or more bits of data per storage element. This improves the margin between the different states, and thus makes the firmware data less susceptible to disturbs and other effects which can cause errors. In addition to this improved reliability, data stored with a fewer number of states can be read faster. Although this reduces the density of data stored in the reserved blocks, only a relatively few blocks are involved. So the impact on the memory system as a whole will usually be low.

The firmware data will usually be stored in the flash memory with an error correction code (ECC) calculated from the data according to a known redundancy code algorithm. The ECC is typically stored along with each sector or page of firmware data. Upon uploading the firmware data from the flash memory reserved blocks to the controller, the data is checked with the ECC for errors. If one or more bits of a sector are erroneous, the sector's ECC may be used to correct them, provided the number of erroneous bits are within the capability of the particular ECC algorithm being used. Alternatively, that sector may be read from one or more alternate copies that are stored in flash memory. If the number of errors in the first copy exceeds the capability of the ECC algorithm to correct them, that sector is certainly read from an alternate firmware copy. If all alternate copies of a sector contain errors, the one with the fewer errors can be corrected and used. The ECC calculations are preferably performed by a hardware circuit provided as part of the controller, rather than by the controller microprocessor under control of the ROM boot code. But once a correctable data error is detected, the microprocessor then becomes involved to correct the error by executing ROM boot code instructions.

A margining technique may also be used when errors of firmware data bits are detected during reading. That is, if errors are determined by use of an ECC to exist, then the same data may be read a second time with different reference levels; i.e., providing a margin for some error in the storage level of one or more bits of the firmware. The margin read will usually be used in response to the ECC detecting a number of errors greater than it can correct. Alternatively, a margin read may be employed after the ECC detects errors but before using the ECC to correct them. In either case, the ECC is used to verify the validity of the data read with a margin. If valid data cannot be read in this way, then the second firmware copy is read.

A "Firmware Present" flag may be set in a reserved sector of the flash memory to indicate that a copy of the firmware code is stored. The boot code then causes the flag to be read before the regions containing the boot code are addressed. If the flag does not indicate an associated firmware copy to be present, then no attempt to read it is made. A "Do Not Load" flag may also be used with validly stored firmware to prevent its loading when diagnostics are being performed. A combination of these two flags controls whether the microprocessor attempts to read and load firmware from the flash memory.

Additional aspects, advantages and features of the present invention are included in the following description of exemplary examples thereof, which description should be taken in conjunction with the accompanying drawings. All patents, patent applications, articles and other publications referenced herein are hereby incorporated herein by this reference in their entirety for all purposes.

BRIEF DESCRIPTION OF THE DRAWINGS

FIG. 1 is a block diagram of a non-volatile memory system in which the various aspects of the present invention may be implemented;

FIG. 2 schematically illustrates the address space of the non-volatile memory of the system of FIG. 1, showing the storage of reserved files including a map thereof and firmware files;

FIG. 3 illustrates the data content of the map file stored in the non-volatile memory of FIGS. 1 and 2;

FIG. 4 is a flow chart showing a first embodiment of an operation of the memory system of FIG. 1 to upload firmware from the non-volatile memory into the controller upon initialization of the system;

FIG. 5 illustrates one aspect of the operation illustrated by the flow chart of FIG. 4;

FIG. 6 is a flow chart showing the downloading of firmware into the non-volatile memory system of FIG. 1 from a host;

FIG. 7 is a flow chart showing an operation occurring during the manufacture of a card to install or upgrade firmware; and FIG. 8 is a flow chart showing a second embodiment of an operation of the memory system of FIG. 1 to upload firmware from the non-volatile memory into the controller upon initialization of the system.

DETAILED DESCRIPTION OF EXEMPLARY EMBODIMENTS

Flash EEPROM systems as described above in the Background may be functionally represented as in FIG. 1. A non-volatile memory system 11 typically includes both an array 13 of non-volatile memory cells and a controller 15. The memory cell array 13 may be of a type described above in the Background, or some other type of re-programmable non-volatile memory. The controller includes circuits 17 that interface with the memory cell array 13, a microprocessor 19, a random-access-memory (RAM) 21, a read-only-memory (ROM) 23, error-correction-code (ECC) calculation circuits 25 and host interface circuits 27. The memory system 11 is connected through the host interface circuits 27 to a host 29. The host 29 may be a personal computer, digital camera, personal digital assistant, cellular telephone, digital audio player or other electronic system having a need for such a non-volatile memory system. The memory system 11 may be embedded within the host, and thus made part of the host system, or in the form of a card that is electrically and mechanically removably connected with the host.

There are several existing standards for such removable cards that are being used for flash memory with an internal controller. One such standard, the PC Card Standard, provides specifications for three types of PC Cards. The PC Card Standard is a product of the Personal Computer Memory Card International Association (PCMCIA). The CompactFlash™ card (CF™ card) is functionally compatible with the PC Card but is much smaller. An even smaller non-volatile memory card is the MultiMediaCard (MMC™). A modified version of the MMC™ card having about the same size is the later Secure Digital (SD) card. Standards exist for these and other electronic cards that are suitable for use as memory cards. Some of these standards are available to any member of the public, and others to members of associations formed to utilize the cards.

In operation, the controller 11 receives sectors of data from the host 29 along with logical addresses of where the data is to be programmed. The controller then maps these addresses into addresses of physical pages within the memory cell array 13. An example physical memory map of the array 13 is given in FIG. 2. The memory is divided into a number of blocks, such as a block 31, where each block is the smallest unit of memory cells that are erased together as part of single erase operation. Each block, in turn, is divided into pages of memory cells, such as pages 33, 35, 37 and 39 of the page 31. Although only four pages are shown to exist in each block for simplicity of explanation, many more pages are usually used. The trend is toward larger blocks with an increasing number of pages, where each page stores multiple sectors of data.

The memory cell array 13 is divided into a large number of blocks, as indicated in FIG. 2. A few of these blocks are designated as "reserved blocks" for storing firmware, parameters and other data that is used by the controller 15 to manage operation of the array 13 and communicate with the host 29. Blocks 41, 43, 45, 47 and 49 are shown in this example to be reserved blocks. These blocks need not be the same in different copies of the same memory system, and can even be dynamically re-designated during operation of a single memory system if changing conditions make this desirable. The controller 15 does not allow access by the host 29 to the reserved blocks but rather the controller uses data stored in them to operate the system. The remaining blocks of the system are available to the controller 15 for the storage of user data provided by the host 29, except that, in some cases, a few blocks are withheld from normal use and designated as redundant blocks that may be substituted for other blocks during operation of the system, if that becomes necessary. The controller maps logical addresses from the host into the physical address space of the array that is made available for the storage of user data.

For the purpose of explaining the storage and use of operating firmware by the controller, a first copy of the firmware is shown to be stored in adjacent reserved blocks 47 and 49, although firmware exceeding the capacity of one block need not necessarily be stored in physically adjacent blocks. A second copy of the firmware is stored in reserved blocks 41 and 43. Because the firmware and other data used by the controller, such as those of operating parameters, are so important to the operation of the memory system, they are stored in two copies as insurance against a possible corruption of the first copy over time as the memory system is used. The number of blocks occupied by the firmware file depends, of course, on the size of the file and data storage capacity of the blocks.

During an initialization of the system, such as occurs on power-up or in response to a hard reset, one copy of the firmware code is loaded from the flash memory 13 into the RAM 21 of the controller. The microprocessor 19 then executes the firmware code from the RAM 21. In order to provide instructions to the microprocessor 19 on loading the firmware code, a small amount of boot code is provided in the ROM 23. Upon system initialization, the microprocessor 19 reads and executes the instructions of the boot code to load one firmware copy and other necessary operating data from reserved sectors of the flash memory 13 into the RAM 21. Thereafter, the microprocessor 19 executes the instructions of the loaded firmware code to control operation of the memory system. Since, with the usual type of ROM 23, the boot code cannot be easily updated or otherwise changed, as much of the system code as possible is placed in the firmware code stored in the flash memory 13 since this can be easily re-written.

Rather than permanently including in the boot code flash memory addresses of the firmware and operating data, the boot code causes the microprocessor to initially access a smaller file in the flash memory that contains a map that includes this information. In this example, the map is stored in one page of the flash memory. In order to be able to store this map in any of several pages, the boot code causes the microprocessor to access several designated pages in order and read the data from them until it finds the map. An example of this is shown in FIG. 2, where pages 51, 53, 55 and 57 are designated. The designated pages are, in this example, the first page (page 0) of several blocks that are physically distributed at different locations across the array. Thus, if it is known that some locations in the array are better than others, the map data are programmed into the better locations since it is important for the controller to be able to read the map accurately. Ten or twelve such potential map pages may be designated, for example, in a memory system having one or several gigabytes of user data storage capacity.

The data stored in an example map page is shown in FIG. 3. A field 61 contains a unique signature that identifies the page to contain the map data. Address data for several reserved files that the microprocessor needs to access are included in the map page, the data for two such reserved files 0 and 1 being shown in FIG. 3. Four data fields are included for each reserved file. For reserved file 0, a field 63 contains an identification (ID) of the file. This could be designated to be the firmware file. A field 65 specifies the length of the file, such as the number of pages. An address within the flash memory of a first copy of the reserved file is specified in a field 67, and a second copy in a field 69. These addresses will commonly be of the first page of the file, which is stored in a number of consecutive pages denoted by the file length field 65. The same data for the reserved file 1, and any others that need to be accessed by the controller at least during the initialization process, are also included within the map.

First Embodiment of Uploading the Firmware to the Controller

A flow chart of FIG. 4 shows an example of initializing the memory system 1 to load firmware code from the flash memory 13 into the controller RAM 21. The process begins upon either the power being turned on to the system, or to receipt of a hard reset in a powered-up system, as indicated by step 71. A next step 73 initializes the controller application-specific-integrated-circuit (ASIC), applies power to the flash memory 13 and sends a signal to the host that the memory is busy. The boot code in the ROM 23, in a step 75, is then read and executed by the microprocessor 19.

The step 75 includes locating the map page in flash memory (see FIG. 2), reading it and then reading a file in a reserved block that is identified in the map to include two one-bit flags. One of these flags is a "FW_Present" flag, which indicates whether or not there is firmware code stored in the flash memory. This flag allows the controller to avoid trying to read firmware code if there is none present in the flash memory. A second "Don't Load" flag is set when it is desired that the firmware not be loaded into the controller, even when it exists in the flash memory. This second flag is set, for example, when diagnostic routines are being executed without the firmware code. If such an operation is not anticipated, however, the Don't Load flag need not be used. If used, it may alternatively be stored outside of the flash memory, such as in a register or a hardware flag. Assuming both flags are used, a next step 77 determines whether they indicate the presence of firmware and the absence of the Don't Load flag being set. If so, a sequence beginning with a step 79 proceeds to load the firmware. If not, the controller enters an idle loop, as indicated by a step 101, with an option for the host to intervene to control the process.

As an alternative to storing the two flags as two bits of data in a reserved sector, two pins may be designated external to the package for setting these two bits. If one of these pins is grounded, for example, the flag represented by that pin is set. The electrical states of these pins are thus interrogated as part of steps 75 and 77.

As indicated by the step 79, the controller sets itself up to read the firmware, including assembling the addresses of the two copies that were read from the map page in step 75 and preparing to read the first copy. Nominal read conditions, such as various voltage levels to be used during read for the particular memory array, can be read from the reserved blocks at the same time as the FW_Present flag (step 75) and also used in the step 79 to set-up the read.

In a step 81, the first page of the first firmware copy is read. In this example, since each page stores one sector of data, the term "sector" is used in the flow diagrams as the unit of reading. If the individual pages were to store two, four or more sectors of data, then all sectors of data within a page would be read at the same time. However, one sector of data may still be processed at a time as indicated by the flowchart of FIG. 4.

The read firmware data are passed through the ECC circuits 25 of the controller in essentially the same manner as any data read from the flash memory. An ECC is calculated from each sector of data and compared with the ECC that is stored as overhead data as part of the sector. The stored ECC is calculated from the data during its programming. So long as error correction is performed at the sector level, this is done regardless of whether there is one or are multiple sectors of data stored in each page. Alternatively, if a single ECC is used for data of multiple host sectors within a single page, then the ECC checking is done only once for a page. However, it is also customary to include two ECCs for each sector of data, one being for the firmware data portion and the other for the overhead portion that includes the data ECC and/or other operational parameters. As a further alternative, the overhead data associated with one or multiple sectors of firmware data may be stored in a different page or block than the firmware data but read sequentially and related together.

In a step 83, in the specific example being described, the ECC circuits 25 cause an ECC to be calculated from the read firmware data and, as a result of a comparison with the ECC read along with the data, provides a few output bits indicating the status of the read sector or sectors of data covered by the ECC. The processor 19, executing the boot code, then causes the status bits to be read. If the status bits indicate that there is no error in the read data, then, as shown by step 85, the page address and the like are updated for reading the next page. If all the pages containing the first copy of the firmware file have not been read, the processing returns to the step 79 to read the next page. However, if the page just read was the last of the first firmware file, the processing proceeds through steps 95, 97 and 99 described below.

But if, in the step 83, the status bits from the ECC circuits 25 indicate that one or more of the read bits are in error, it is next determined by executing the boot code, in a step 89, whether the controller 15 is enabled to use the ECC to correct the error(s), if it can. This is explained below. If enabled, it is determined from the status bits, in a step 91, by the microprocessor 19 executing the boot code, whether the number and types of errors are such as to be correctable by the specific error correction algorithm being used. If so, the read data are corrected by executing the boot code, in a step 93, and the processing then proceeds to step 85, the same as if the data had been read without any errors. But if the errors are determined from the status bits generated by the ECC circuits 25 not to be correctable by use of the error correction algorithm included in the boot code, then, in a step 105, the next in order firmware copy is identified. A typical ECC algorithm is capable of identifying a given number of bit errors depending upon its complexity but able to correct fewer bits than that. For example, if the sector data of first firmware file copy 0 is uncorrectable, then the same sector of the second firmware file copy 1 is then read and used instead. A step 107 determines whether an unread firmware data copy remains, and, if so, causes the processing to proceed back to the step 81 to repeat the process described above on the same sector of the second firmware copy. But if that sector has been unsuccessfully read from both (or more if provided) copies of the firmware code, the processing then proceeds to a step 109, as described below.

But first returning to the step 89, if correction was not enabled, which is the usual initial condition, a next step 103 causes a flag to be set that indicates the presence of an ECC error. The same sector of the next copy is then read by the steps 105, 107, 81 and beyond, in the loop just described. The flag set by the step 103 is associated with the sector of a firmware copy containing one or more bit errors, and is preferably stored as part of the overhead of the sector or elsewhere, for later reference in order to take some remedial action with respect to that data sector. The firmware can include a routine to search for all such flags that were set during the uploading process, so that, once the firmware is successfully loaded into the controller, some action may be taken to either directly correct the erroneous firmware data sectors stored in the flash memory or address a possible cause of the erroneous data. For example, the flagged firmware data sectors may be scrubbed or refreshed at that time by correcting the data and then rewriting the corrected data in the same flash memory page. Several specific scrubbing processes are described in U.S. Pat. Nos. 5,532,962, 6,151,246 and 6,222,762, and in U.S. patent application Ser. No. 10/678,345, filed Oct. 3, 2003, for example. The data of a sector may be corrected by the use of the sector data ECC, or by reading the data with different reference levels than normally used ("margin read") in order to compensate for those stored charge levels that have moved (or appear to have moved due to field coupling with other charge storage elements) out of the original tight range for the states to which they have been programmed. Alternatively, sectors of data with uncorrected errors may be read from another copy of the firmware and inserted into the copy being corrected. The corrected copy is then re-written to the flash memory, preferably in a new location but may also be re-written to the same location after erasure.

Returning again to the step 89, correction of any erroneous read data is initially disabled, in this example. Rather than correcting erroneous data from one copy, the same sector is first read from the next firmware copy in order until it is determined that a particular data sector cannot be read from any of the copies stored in flash memory without some error. This is determined by the step 107 after attempts have failed to read the given sector from all firmware copies without any errors. The processing then causes the sector to be reread a designated number of times from the firmware copies, one at a time in order, through a loop including steps 109, 111, 112 and 113 that returns to the step 81, until the sector data are read without error, thus causing the processing to proceed from the step 83 to the step 85. Some of the retries may be made under different margin conditions, as indicated by the step 112.

But if this does not succeed after the last of the number of retries that are allowed, as determined by the step 113, correction of the errors are allowed to take place upon the next read of the same sector data by enabling ECC correction in a step 115. This causes the processing, when a correctable ECC error is determined by step 83 to exist, to be directed by the step 89 through the path of steps 91 and 93, as described above. If an uncorrectable ECC error exists, the same is again tried on the next copy of the data sector through steps 105 and 107. But if the reads with ECC correction of all copies of the firmware data sector fail, then, at the step 111, the processing is placed into the idle loop state indicated by the step 101.

In summary, for this example implementation, when two firmware copies are stored in the flash memory, a given data sector having errors in both copies can each be read up to a number of times determined by the set number of retries established in the step 109 without trying to correct the data with the ECC. Thereafter, the last read retry of the given sector from each copy is performed with the ability to correct the data with the ECC. Only if neither data sector is correctable does the process fail.

Alternatively, but usually not preferably, the step 89 can be set to always enable correction but at the same time setting the flag in the step 103 for later dealing with the data errors in the sector. In such a case, the processing of FIG. 4 will read the given data sector only once from each firmware copy. The first copy is read and its errors attempted to be corrected by the ECC. If successful, the step 85 is reached. If unsuccessful, the given sector of the second firmware copy is read and, if errors exist, correction is attempted. If both of these are unsuccessful, then the processing proceeds to the step 109.

Although not specifically illustrated in FIG. 4, step 75 of reading the map page and any portions of a reserved block is preferably executed in a manner similar to that described for the firmware copies. That is, one or more ECCs are stored along with such data and used to determine, during reading, whether the read data contain any bit errors or not. If so, and if correctable, the data may be corrected by use of the ECC. If not correctable, the data are re-read, potentially under different read conditions. The ECC may be used on the re-read data if errors still exist. Once corrected, the map page and/or reserved block portions in error are re-written, usually in a different location within the flash memory. A duplicate copy of the map page may be kept in case good data cannot be obtained from the one copy.

Referring to FIG. 5, an example is conceptually shown of a successful read of firmware from both copies stored in flash memory according to the portion of the processing described with respect to FIG. 4. Assuming for simplicity of explanation that the firmware is 8 sectors long, the 8 sectors of a firmware file 121 that is read into the controller RAM 21 are shown to be taken from both firmware copies 123 and 125. Sectors 0, 1, 2, 4, 5 and 7 come from the first firmware file 123 and sectors 3 and 6, because they could not be successfully read from the first copy, are taken from the second firmware file 125.

Returning to the processing flow diagram of FIG. 4, particularly the step 87, the processing proceeds to the step 95 once a firmware file, such as the file 121 of FIG. 5, has been read. As part of the step 95, overhead fields 127 and 129 (FIG. 5) of the read firmware file are checked. These fields each contain both the length of the firmware file and a designation of the version of the boot code that is stored in the ROM 23, since the boot code can change over time in different memory systems. The actual length of the read file 121 is compared with the value read from the fields 127 and 129. The designation read from the fields 127 and 129 of the ROM boot code version is also compared with a version designation included in the boot code itself. If, in the step 97, the comparison of these lengths and boot code designations are both determined to be positive, the firmware file 121 (FIG. 5) is uploaded to the controller RAM 21 (FIG. 1), and the process is complete. However, if either of the firmware file lengths or the boot code version designations do not compare positively, the processing stops, as indicated by the step 101, until some further instructions are received from the host.

Downloading the Firmware to the Flash Memory

FIG. 6 illustrates a process for programming firmware into reserved sectors of the flash memory 13 of the memory system 11 of FIGS. 1 and 2. This is accomplished through the host system 29, usually in the form of a computer, typically by the manufacturer of the memory system during final stages of production or when the firmware of an earlier manufactured card is being updated. A purchaser and user of the memory system will usually not load firmware code into the flash memory.

Referring to FIG. 6, a step 131 indicates a start to the downloading process. During a step 133, different patterns of data are alternately written into and read from various flash memory blocks that are candidates for reserved blocks to store the firmware data. Two firmware code storage areas of one or more blocks each, such as the block pairs 41, 43 and 47, 49 of FIG. 2, are selected as a result of this test. Only blocks that allow reading of the programmed test data without any errors are selected. Further, a test could additionally be performed on the stored test data to determine whether stored charge levels are within optimum ranges. Also, the memory system can be put through various environmental routines after programming the test data to determine whether the stored data are changed as a result.

In a next step 135, the host computer loads downloading firmware into the controller RAM 21 to provide instructions for writing the memory controlling firmware into the selected reserved blocks of the flash memory 13. (FIGS. 1 and 2) Next, in a step 137, the ROM boot code compatibility indication stored as part of the firmware to be programmed into the flash memory and the boot code version indication stored in the ROM 23 are read by the host and compared. Downloading of the memory system controlling firmware will proceed only if compatible with the boot code that is permanently and non-rewritably stored in the ROM 23. If an incompatibility is noted, then the remedy is usually to change the version of system firmware code to be loaded into the flash memory to one that is compatible with the ROM boot code that is already there.

The host then sends a firmware write command to the controller 15, in a step 139, and the controller 15 initially responds by clearing the FW_Present flag, in a step 141. This flag has been described above. Next, in a step 143, a group of sectors of the firmware data is transferred by the host to the memory system. As indicated by a step 145, one of the two reserved block areas selected by the step 133 for storing the firmware code is designated to receive the first firmware code copy. The controller 15 then programs the firmware data sectors, previously received from the host, into the first selected reserved block(s), as indicated by a step 147. If this programming step is successful, as determined by a step 149, the controller causes the same firmware data sectors to be programmed into the second selected reserved block(s). A partial loop including steps 151, 153 and 145 cause the second location to be addressed and the same data sectors are programmed therein by the step 147.

Once this group of data sectors have been programmed in both locations of the flash memory, the processing proceeds to a step 155 to determine whether there are more firmware data sectors that need to be programmed. If so, another group of data sectors is sent by the host in the step 143, and these are programmed in the same manner, through the loop including the steps 145-153, in both flash memory locations. After all the firmware code sectors have been programmed in this manner, as determined by the step 155, the FW_Present flag is set, as indicated by a step 157, and the downloading operation is complete at the step 159.

If, in the step 149, a failure of the programming of a group of sectors is detected, the programming of those sectors in step 147 is repeated a preset number of times, as indicated by the steps 161 and 163. If a successful programming of any one group of sectors is not accomplished in that number of tries, then a failure of the programming operation is noted in a step 165 and the process is terminated.

Even though the flash memory is operated in multi-state to store more than one bit of data per charge storage element, as described above in the Background, the reserved blocks of a multi-state system can be operated to store a lesser number of one or more bits per charge storage element. For example, if the charge storage elements are being operated in eight states for the user data, data may be stored in the reserved blocks with four states per charge storage element. Similarly, if the user data is being stored in four states, the reserved block data can be stored in binary. This can be particularly valuable for the reserved blocks storing the memory map and firmware. Because of the larger ranges that define each state when a fewer number of states are employed, data stored in a fewer number of states is less subject to being read erroneously. There is a greater margin between the ranges of memory transistor threshold voltages and charge storage levels, and the ranges are larger, when fewer states are stored in each charge storage element. Of course, less data is stored in those blocks operated with a fewer number of states but such operation of reserved blocks storing the memory map, the operating parameters, the flags and the firmware discussed above does not significantly affect the storage capacity of the memory because this requires operating only a small proportion of the memory in the fewer number of states.

FIG. 7 shows an overall process for programming firmware data into flash memory systems by the manufacturer of such systems in the form of memory cards, both for new blank cards and those where the firmware is being updated. This process includes use of both the firmware uploading of FIG. 4, in a step 165, and the firmware downloading of FIG. 6, in a step 167. At the beginning, the card is connected with a host that determines, in steps 169 and 171, whether the memory card is a blank one or not. If blank, the memory array is formatted, in steps 173 and 175. Next, the firmware copies are programmed into the card memory array as previously described with respect to FIG. 6. Once it is determined that the firmware has been successfully programmed into the card, in a step 177, the process ends. The card is then ready for use.

If in the step 171 it is determined that the card is not blank, firmware assumed to be resident in the flash memory is then loaded into the controller RAM as described above with respect to FIG. 4. If in a step 179 it is determined that the firmware upload failed, then a failure analysis function 181 is performed to learn the reasons for the failure. In FIG. 4, failure is considered to exist when the process is in the idle loop 101. In response, the card is then discarded.

However, if in the step 179 it determined that the firmware has been properly uploaded, the firmware may be rewritten by the process of step 167 if it is determined that either the card needs to be reformatted (step 183) or that the firmware should be upgraded to a newer version (step 185). However, if neither reformatting nor firmware upgrading are necessary, then the confirmation that the firmware loads properly from the flash memory into the controller RAM causes the process to end. The card has then been confirmed to be ready for use.

Second Embodiment of Uploading the Firmware to the Controller

FIG. 8 shows a second embodiment of a process controlled by the ROM boot code to upload the firmware from flash memory 13 into the RAM 21 of the controller 15 (FIG. 1). This process is similar to that of the first embodiment described above with respect to FIG. 4. Those steps of FIG. 8 which are the same or essentially the same as those of FIG. 4 are given the same reference numbers, and are not explained further here. The differences between the two embodiments lay in responding to determinations that an error exists in the data read.

Referring to FIG. 8, the processing of this embodiment proceeds, in response to the determination in step 83 that a data error has been detected by use of the ECC, directly to the setting of the flag in step 103 for the later uses described above. In a next step 191, it is determined whether the error is correctable by the ECC being used and whether the error involves less than a specified number of bits (less than N bits). If so, the data is corrected by the ECC in a step 193 and the processing continues to read the next sector of firmware data. The erroneous data is corrected at this early stage of the processing, in this embodiment, only if the number bits to be corrected are low, less than the number of bits of the read sector that the ECC is capable of correcting. This is because correcting the data takes processing time in an amount related to the number of bits being corrected.

Therefore, if the determination in step 191 is that the data is either not correctable or is correctable but has N or more bits to correct, a next step 195 determines which is the case. If the N or more erroneous bits are correctable, a step 197 determines whether the given sector has been read from the one or more other firmware copies stored in the flash memory. If so, then the data is corrected, using the ECC, in the step 193 and the processing proceeds through the step 85 to the next data sector to be read. If there remains a firmware copy for which the given sector has not yet been read, then a step 199 switches to cause the step 81 to read the other copy.

However, if it is determined in step 197 that the N or more erroneous bits are not correctable, then a step 201 can be used to determine whether a the given sector has been read a specified number of times in a regular manner from all the firmware copies. If not, then the step 199 will address the given sector in another firmware copy and it is read by the step 81. If all firmware copies have already been read the specified number of times, then extraordinary efforts are employed to read the data. The specified number of regular reads can be 2, 3 or more but re-reading data takes time and re-reading the same data sectors under the same conditions may not be highly likely to provide correct data after the initial reads have given uncorrectable erroneous data. Therefore, the process can be implemented with the specified number of reads of each firmware copy being one, after which, if none is successful, the extraordinary reading steps are taken.

A first step 203 in the extraordinary reading process is to determine whether one or more specified tries to read the given sector of data from the given firmware copy has already been performed. If not, extraordinary reading parameters are set by a step 211, and the sector is again read in the step 81 with these different parameters. But if the given data sector has been read without success the one or more specified times with the extraordinary reading parameters, a step 205 determines whether that is the case for the other firmware copies stored in the flash memory. If so, the firmware uploading is considered to have failed, as indicated at 207, as no further techniques for reading or correcting the erroneous data are provided. But if all firmware copies have not been read in the extraordinary manner, then the extraordinary reading parameters are set by a step 209 and the next step 199 causes the given sector of a different firmware copy to be read by the step 81.

The extraordinary reading process can include the setting in steps 209 and 211 of different reading conditions that are more likely to read erroneous data. One technique, referred to as margining, widens the reading range for each state of a memory cell charge storage element from that used during the first, ordinary read of the data sector. This has the effect of reducing the margin between the ranges, so can introduce other errors in the reading process. But when the data cannot be read normally, margining can also cause the states of cells that have drifted out of their respective ranges to be read correctly. Whether a margined read is correct or not is determined by use of the ECC, through steps 83 and beyond, in the same manner as with the normal data reads.

CONCLUSION

Although the various aspects of the present invention have been described with respect to exemplary embodiments thereof, it will be understood that the present invention is entitled to protection within the full scope of the appended claims.

It is claimed:

1. A method of initiating a memory storage system having flash memory containing at least first and second copies of firmware code stored in different locations therein, a microprocessor, a read-only-memory (ROM) containing microprocessor accessible boot code and a random-access-memory (RAM) for storing microprocessor accessible firmware code, the method comprising:
   executing the boot code to transfer a first copy of the firmware from the flash memory to the RAM,
   identifying any bit errors in the transferred first copy of the firmware code,
   if bit errors are identified that are correctable, correcting the erroneous bits,
   if bit errors are identified that are not correctable, reading at least a portion of the second copy of the firmware code into the RAM in place of at least a portion of the first copy containing the uncorrectable bit errors, and
   executing an error free copy of the firmware code from the RAM.

2. The method of claim 1, wherein identifying any bit errors in the transferred first copy includes calculating error-correction-codes (ECCs) from individual portions of the first copy of the firmware by passing the firmware portions through ECC circuitry in succession as they are being transferred from the flash memory to the RAM, and comparing the calculated ECCs with ECCs previously calculated from said portions of the first copy of the firmware data.

3. The method of claim 2, wherein correcting the erroneous bits includes the microprocessor executing an error correction algorithm of the boot code to correct erroneous bits.

4. The method of claim 2, wherein the individual portions of the first copy of the firmware code include one or more sectors of data and an ECC previously calculated therefrom and stored in the flash memory therewith.

5. The method of claim 1, which additionally comprises, prior to executing the boot code to transfer a first copy of the firmware from the flash memory to the RAM, the following:
   initially accessing a plurality of fixed locations in the flash memory one at a time until an initialization memory map is discovered to be stored at at least one of the plurality of fixed locations and that contains addresses of the different locations of the flash memory wherein said at least first and second copies of firmware code are stored,
   reading data of the initialization memory map to obtain said addresses, and
   thereafter accessing the first copy of the firmware code.

6. The method of claim 5, which additionally comprises:
   identifying any bit errors in the data read from the initialization memory map, if bit errors in the data read are identified that are correctable, correcting the erroneous bits, and if bit errors in the data read are identified that are not correctable, re-reading the data of the initialization memory map under different conditions.

7. The method of claim 1, wherein the at least first and second copies of firmware code are stored in the different locations of the flash memory with only a given number of one or more bits of firmware code stored per flash memory storage element thereof, while the memory storage system is further characterized by storing user data in other locations of the flash memory with more than said given number of bits of user data per storage element thereof.

8. The method of claim 7, wherein said given number of one or more bits is exactly one bit per flash memory storage element.

9. The method of claim 1, additionally comprising:
identifying any bit errors in the transferred at least a portion of the second copy of the firmware code, and if bit errors identified in the transferred at least a portion of the second copy of the firmware code are not correctable, repeating the reading of said at least a portion of the second copy of the firmware code under conditions that tend to reduce the number of bit errors in the transferred at least a portion of the second copy.

10. The method of claim 1, additionally comprising, prior to executing the boot code to transfer a first copy of the firmware from the flash memory to the RAM, checking the state of a firmware present flag that is set when firmware is stored in the flash memory and continuing to execute the boot code to transfer the first copy of the firmware from the flash memory to the RAM only when the firmware present flag is set.

11. The method of claim 1, additionally comprising, in response to identifying a number of bit errors of a predefined number of one or more, of setting a housekeeping flag associated with the locations of the flash memory from which the erroneous data of the first copy of the firmware are stored.

12. The method of claim 11, additionally comprising, in response to the housekeeping flag being set, of correcting the erroneous data of the first copy of the firmware after an error free copy of the firmware code has been transferred into the RAM.

13. The method of claim 12, wherein correcting the erroneous data of the first copy of the firmware includes rewriting the corrected first copy of the firmware in the flash memory.

14. The method of claim 13, wherein rewriting the corrected first copy of the firmware includes re-writing the corrected first copy in a different location than it was originally stored.

15. The method of claim 12, wherein correcting the erroneous data of the first copy of firmware includes use of an error-correction-code.

16. The method of claim 12, wherein correcting the erroneous data of the first copy of firmware includes transfer of good data from the second copy of firmware code.

17. A method of operating a memory storage system having flash memory, a microprocessor, a read-only-memory (ROM) containing boot code accessible by the microprocessor, a random-access-memory (RAM) and circuitry that calculates an error correction code (ECC) from data passing through it, the method comprising:
storing at least first and second copies of firmware code in different addressable locations of the flash memory by passing the firmware copies one at a time through the ECC circuitry and storing the ECCs calculated thereby in the flash memory, thereafter initiating operation of the memory system by causing the microprocessor to execute the boot code to transfer the first copy of the firmware from the flash memory to the RAM through the ECC circuitry which calculates an ECC therefrom, utilizing the calculated and stored ECCs to identify any bit errors in the transferred first copy of the firmware code, and if bit errors are identified to be correctable, causing the microprocessor to execute an error correction algorithm within the boot code to correct the erroneous bits, in order to result in the firmware code being loaded into the RAM without any errors, or if bit errors are identified to be uncorrectable, transferring at least a portion of the second copy of the firmware code into the RAM in place of at least a portion of the first copy containing the uncorrectable bit errors, in order to result in the firmware code being loaded into the RAM without any errors.

18. The method of claim 17, wherein storing the firmware code includes storing ECCs individually calculated from one or more sectors of the firmware code.

19. The method of claim 17, additionally comprising storing a map in one of a predetermined plurality of locations of the flash memory that contains the addressable locations of said at least first and second copies of firmware code, and wherein execution of the boot code by the microprocessor includes initially locating the map by accessing the predetermined plurality of locations one at a time until the map is found, and reading the contents of the map at the location where the map is stored.

20. The method of claims 17, wherein storing the firmware code additionally includes setting a flag to indicate the presence within the flash memory of at least one firmware copy, and wherein executing the boot code to transfer either of the first or second copies of the firmware code includes first reading the flag associated therewith and proceeding to read the copy of the firmware code only if the associated flag is set.

21. A flash memory storage system, comprising:
an array of flash memory cells storing data in charge storage elements and containing a memory map at at least one of a plurality of predetermined addresses of the array, said map including data specifying addresses wherein one or more copies of firmware code are stored, a controller processor, a read-only-memory containing boot code that the processor accesses and executes in response to initialization of the storage system, a random-access-memory that is accessible by the processor to obtain instructions to be executed, and wherein the boot code causes the processor to access the plurality of predetermined addresses within the flash memory to locate and read the data of the memory map specifying addresses wherein one or more copies of the firmware are stored, thereafter reading the firmware code located at at least one of said specified one or more addresses and thereafter writing the read the firmware code into the random-access-memory.

22. The system of claim 21, wherein the map and the firmware code are stored in the flash memory with one-bit thereof per memory cell storage element, and further wherein data are stored at at least some addresses of the memory array other than those containing the map and firmware with more than one-bit thereof per memory cell storage element.

23. A flash memory storage system, comprising:
an array of flash memory cells storing data in charge storage elements and containing at least first and second copies of firmware code stored therein along with respective first and second sets of error-correction codes (ECCs) calculated from the first and second copies of the firmware code, a controller processor, circuitry that calculates ECCs from data passing through the circuitry, a read-only-memory containing boot code that the processor accesses and executes in response to initialization of the storage system, a random-access-memory that is accessible by the processor to obtain instructions to be executed, and wherein the boot code causes the processor to read the first firmware code copy including passing the read first firmware code copy through the ECC calculation circuitry which calculates ECCs and provides with respect to the first set of ECCs stored with the first firmware code copy a status with respect to any data errors existing in portions of the first firmware code copy to which the ECCs pertain, and (A) if the status indicates that there are no data errors in a given one of the portions of the first firmware code copy, thereafter writing the given portion of the first copy of the firmware code into the random-access-memory, but (B) if the status indicates that there are data errors in the given portion of the first firmware code copy, the boot code causes the processor to determine whether the number of bit errors in the firmware code exceed a given number, and (i) if the number of bit errors do not exceed the given number, further causes the processor to correct the erroneous bits and write the corrected first firmware code copy into the random-access-memory, but (ii) if the number of bit errors is equal to or exceeds the given number, further causes the processor to read at least a portion of the second firmware copy, pass the read second firmware code through the ECC calculation circuitry which calculates at least one ECC therefrom and provides a status with respect to any data errors existing in said at least a portion of the second firmware code copy to which said at least one ECC pertains, and if the status indicates that there are no data errors in said at least one portion of the second firmware code copy, thereafter writing said at least one portion of the read second copy of the firmware code into the random-access-memory.

24. The system of claim 23, wherein the firmware code is stored in the flash memory with one-bit thereof per memory cell storage element, and further wherein data are stored at at least some of addresses of the memory array other than those containing the firmware code with more than one-bit thereof per memory cell storage element.

25. A flash memory storage system, comprising:

an array of flash memory cells storing data in charge storage elements and containing at least one copy of firmware code stored therein along with a first flag indicating the presence of the firmware code and a second flag indicating that the firmware code, if present, should not be loaded, a controller processor, a read-only-memory containing boot code that the processor accesses and executes in response to initialization of the storage system, a random-access-memory that is accessible by the processor to obtain instructions to be executed, and wherein the boot code causes the processor to look for the first and second flags, and, (A) if the first flag is present and the second flag is not present, to proceed to load the firmware code into the random-access-memory, or (B) if both of the first and second flags are present, to provide access to the firmware code for testing without loading the firmware code into the random-access-memory, or (C) if the first flag is not present, neither attempt to load the firmware code into the random-access-memory nor attempt to provide access to the firmware code for testing.

26. The system of claim 25, wherein the firmware code and first and second flags are stored in the flash memory with one-bit thereof per memory cell storage element, and further wherein data are stored at at least some addresses of the memory array other than those containing the firmware code and first and second flags with more than one-bit thereof per memory cell storage element.

27. A method of initiating a memory storage system having flash memory containing at least first and second copies of firmware code stored in different locations therein and user data in other locations therein, a microprocessor, a read-only-memory (ROM) containing microprocessor accessible boot code and a random-access-memory (RAM) for storing microprocessor accessible firmware code, the method comprising:

storing one bit of said at least first and second copies of the firmware code in individual storage elements of memory cells within said different locations of the flash memory and more than one bit of said user data in individual storage elements of memory cells within said other locations of the flash memory, executing the boot code to transfer the first copy of the firmware from the flash memory to the RAM, identifying any bit errors in the first copy of the firmware code as it is being transferred, either correcting specific ones of the identified bit errors in the transferred first firmware code copy or reading at least a portion of the second copy of the firmware code to replace at least a portion of the first firmware code copy containing the identified bit errors, and executing an error free copy of the firmware code from the RAM.

* * * * *

UNITED STATES PATENT AND TRADEMARK OFFICE
CERTIFICATE OF CORRECTION

PATENT NO.      : 7,594,135 B2                                     Page 1 of 1
APPLICATION NO. : 10/751033
DATED           : September 22, 2009
INVENTOR(S)     : Gonzalez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1176 days.

Signed and Sealed this

Twenty-eighth Day of September, 2010

David J. Kappos
*Director of the United States Patent and Trademark Office*